(No Model.)
G. A. LIEBIG & C. WILLMS.
GALVANIC BATTERY.
No. 437,469. Patented Sept. 30, 1890.
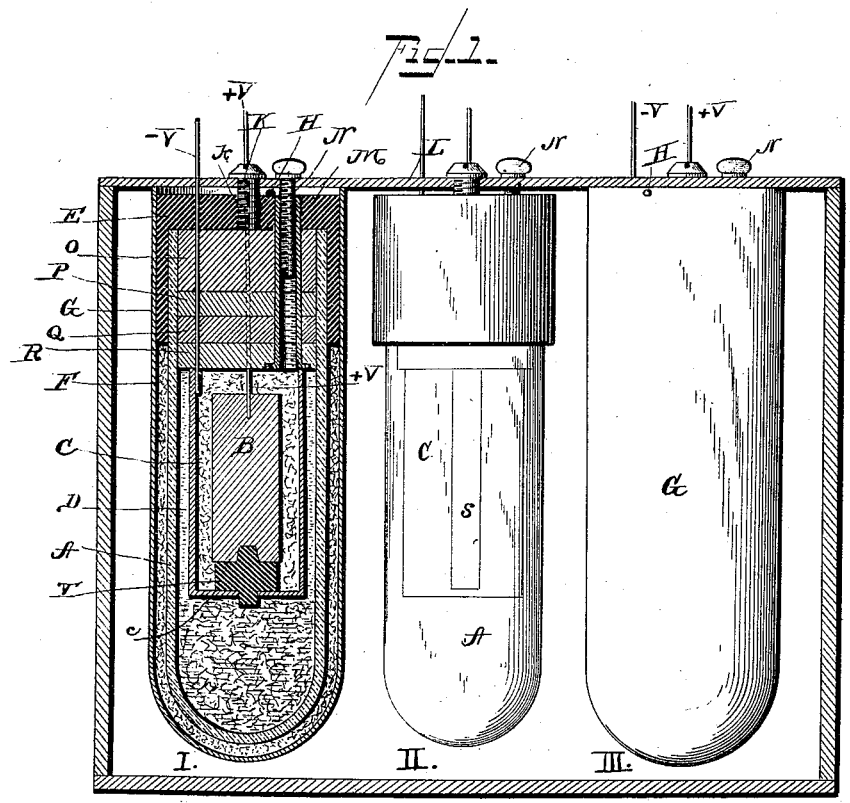
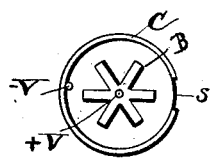
WITNESSES
F. L. Ourand
W. A. Smith
Charles Willms,
Gustav A. Liebig,
INVENTORS
by
Whitman + Wilkinson
Attorneys

UNITED STATES PATENT OFFICE.

GUSTAV A. LIEBIG AND CHARLES WILLMS, OF BALTIMORE, MARYLAND.

GALVANIC BATTERY.

SPECIFICATION forming part of Letters Patent No. 437,469, dated September 30, 1890.

Application filed June 25, 1890. Serial No. 356,670. (No model.)

*To all whom it may concern:*

Be it known that we, GUSTAV A. LIEBIG and CHARLES WILLMS, citizens of the United States, residing at Baltimore, in the State of Maryland, have invented certain new and useful Improvements in Electric Batteries; and we do hereby declare the following to be a full, clear, and exact description of the invention, such as will enable others skilled in the art to which it appertains to make and use the same.

Our invention relates to certain improvements in electric batteries, and is more especially applicable to chloride-of-silver batteries.

The objects of our invention are to produce a large current-cell with low internal resistance; to produce a portable cell suitably adapted for use either singly or in portable groups or batteries; to provide a protection against any injurious effects to clothing or vicinity from the escape of liquids upon the breaking of one or more cells, and to provide a vent for the injection of the fluid and for allowing, when it is deemed advisable, any gases to pass off.

In the accompanying drawings, in which corresponding parts are indicated by similar letters, Figure 1 represents a section through a battery showing three of our cells, cell I being shown in section, cell II with the metal case removed, and cell III with the metal case on. Fig. 2 represents a cross-section of the two electrodes at right angles to their axes.

The battery-cell consists of a case A, of glass or some other suitable material, suitably sealed, containing the electrodes B and C and the exciting-fluid D. Over this glass case we cement a hard-rubber cap E. The cell is then wrapped with dry cotton cloth F or some other soft and absorbent material, and is then pushed firmly down into a metal envelope G, where it is held in place either by a metallic pin H just over the rubber cap or by indenting the metal envelope above the rubber cap. The object of the hard-rubber cap is to furnish a holding substance for the screw K, whereby the cell is firmly held against the cover L of the battery when used in groups.

The vent M and plug N are for the purpose of injecting the fluid, and also to allow the gases generated to escape when desired.

The object of the winding of cotton or other soft absorbent is two fold: first, to protect the glass cell from breaking in the metal envelope when carelessly handled; second, to absorb the liquid should the glass case be broken by careless handling or by pressure of the gases within. The metal envelope is both for the protection of the cell and contents and to hold the liquid should the glass cells by accident be broken.

In the cell itself we use any suitable sealing—either one of those shown in our patent, No. 421,801, granted February 18, 1890, or that patented to John A. Barrett in Patent No. 374,862, granted December 13, 1887—or the sealing shown in the drawings, where O represents a hard sealing composed of a mixture of plaster-of-paris and resin, preferably pine resin or shellac. P represents a hard sealing composed of a mixture of resin and gutta-percha. Q represents a viscous sealing of resin and resin-oil mixed. R represents a hard sealing composed of a mixture of resin and gutta-percha.

In our former patents we have made the upper sealing O of plaster-of-paris alone; but we have discovered that by mixing the dry plaster-of-paris with fused resin and applying when hot the mass, when cooled, makes a hard and impervious stopper greatly superior to the plaster-of-paris alone.

All of the sealings O, P, Q, and R are both mixed and applied when hot. The object of these various sealings is to hermetically close the cell.

We diminish the internal resistance by increasing the surfaces of the electrodes and by bringing those surfaces into close proximity. This is done by making the zinc electrode C in a cylindrical roll with one end turned over, forming a cylinder-head $c$. A longitudinal slot $s$ is cut partly or all the way down one element of the cylinder for the purpose of allowing the fluid to enter freely.

The positive electrode is formed of a corrugated or star-shaped mass of chloride of silver fused about a piece of silver wire $+V$. This fits closely within, but nowhere touches, the zinc electrode. The silver electrode is supported on and steadied by an insulating-disk T, which rests on the bottom of the zinc cylinder $c$. The spaces between and around the electrodes are filled with filter-paper, cotton, or other absorbent material, and then the vent is closed, and after the fluid is injected the cell is ready for use. This absorbent material is well saturated with the zinc-sulphate solution, the absorbent being used to prevent the cell being emptied should it be overturned or laid on its side when the vent-plug is either loose or out.

+V is the wire leading from the positive or silver pole, and —V that leading from the zinc-pole.

When we use a number of cells in a portable battery, they are screwed to the lid of the box containing them, and melted pitch or paraffine is poured into the box and allowed to solidify; but the melted pitch or paraffine is not necessary, as the screws are sufficient to hold the cells firmly in place against any ordinary jars or strains.

We do not claim the zinc-sulphate solution, that being patented to John A. Barrett; but What we do claim is—

1. In an electric battery, the combination of a glass cell wrapped with dry cotton cloth or other absorbent material and having a hard-rubber cap cemented thereon with a metallic envelope incasing the whole, substantially as described.

2. In an electric battery, the combination, in a portable cell adapted to be used either singly or in groups, of the glass cell A, wrapped with dry cotton cloth or other absorbent material, and the hard-rubber cap E, cemented thereon and having screw-threads $k$ for the screw K, whereby the cell can be firmly held against the cover L of a battery-box, with the metallic envelope G and pin H, as herein set forth.

3. In an electric battery, the combination of the glass cell A, wrapped with dry cotton or other absorbent material, the hard-rubber cap E, cemented thereon and having vent M and screw-plug N, screw-thread $k$, and screw K with the metallic envelope G and pin H, as and for the purposes described.

4. In an electric battery, the combination of a glass cell wrapped with dry cotton or other absorbent material and having a hard-rubber cap cemented thereon and a metallic envelope incasing the whole with the corrugated chloride-of-silver and hollow cylindrical zinc electrodes and the solution of zinc sulphate and the filter-paper, cotton, or other absorbent saturated therewith, as herein shown and described.

5. In an electric battery, the combination of a glass cell wrapped with dry cotton or other absorbent material and having a hard-rubber cap cemented thereon and a metallic envelope incasing the whole with the corrugated chloride-of-silver and the inclosing cylindrical zinc electrode slotted along one element, the insulating-support T, and the solution of zinc sulphate and the filter-paper, cotton, or other absorbent saturated therewith, as herein set forth.

6. In an electric battery, the combination, in a portable cell adapted to be used either singly or in groups, of the glass cell A, wrapped with dry cotton or other absorbent material, and the hard-rubber cap E, cemented thereon and having screw-threads $k$ for the screw K, whereby the cell can be firmly held against the cover L of the battery-box, with the metallic envelope G and pin H, together with the star-shaped chloride-of-silver electrode B, the inclosing cylindrical zinc electrode C, slotted at one side and bent over at one end $c$, the insulating-disk T, and the zinc sulphate and the filter-paper, cotton, or other absorbent saturated therewith, substantially as described.

7. In an electric battery, the combination of the glass cell A, wrapped with dry cotton or other absorbent material, the hard-rubber cap E, cemented thereon and having vent M and screw-plug N, the screw-thread $k$, and screw K with the metallic envelope G and pin H, together with the star-shaped chloride-of-silver electrode B, the inclosing cylindrical zinc electrode C, slotted at one side and bent over at one end $c$, the insultating-disk T, and the solution of zinc sulphate and the filter-paper or other absorbent saturated therewith, substantially as described.

8. In an electric battery, the combination of a cell of glass or other suitable material with a sealing composed in part of a mixture of plaster-of-paris and resin mixed when hot and applied to the cell warm and plastic, substantially as described.

9. In an electric battery, the combination of a cell of glass or other suitable material with a sealing composed of two or more layers of different sealing compounds, the upper layer being composed of a mixture of plaster-of-paris and resin mixed when hot and applied to the cell when warm and plastic, as herein shown and described.

10. In an electric battery, the combination of a glass cell wrapped with dry cotton or other absorbent material and having a hard-rubber cap cemented thereon and a metallic envelope incasing the whole with the corrugated chloride-of-silver and the inclosing cylindrical zinc electrode slotted along one element, the insulating-support T, the sealings O, P, Q, and R, and the solution of zinc sulphate and the filter-paper, cotton, or other absorbent saturated therewith, as herein set forth.

11. In an electric battery, the combination, in a portable cell adapted to be used either singly or in groups, of the glass cell A, wrapped with dry cotton or other absorbent material, and the hard-rubber cap E, cemented thereon and having screw-threads $k$ for the screw K, whereby the cell can be firmly held against the cover L of the battery-box, with the metallic envelope G and pin H, together with the star-shaped chloride-of-silver electrode B, the inclosing cylindrical zinc electrode C, slotted at one side and bent over at one end $c$, the insulating-disk T, the sealings O, P, Q, and R, and the zinc sulphate and the filter-paper, cotton, or other absorbent saturated therewith, substantially as described.

12. In an electric battery, the combination of the glass cell A, wrapped with dry cotton or other absorbent material, and the hard-rubber cap E, cemented thereon and having vent M, and screw-plug N, the screw-thread $k$, the screw K, and the sealings O, P, Q, and R, with the metallic envelope G and pin H, together with the star-shaped chloride-of-silver electrode B, the inclosing cylindrical zinc electrode C, slotted at one side and bent over at one end $c$, the insulating-disk T, and the solution of zinc sulphate, and the filter-paper or other absorbent saturated therewith, substantially as described.

In testimony whereof we affix our signatures in presence of two witnesses.

GUSTAV A. LIEBIG.
CH. WILLMS.

Witnesses:
GEO. P. SHERMAN,
SAMUEL S. BOGGS.